United States Patent [19]

Baheti et al.

[11] Patent Number: 4,611,111

[45] Date of Patent: Sep. 9, 1986

[54] METHOD TO DETERMINE WELD PUDDLE AREA AND WIDTH FROM VISION MEASUREMENTS

[75] Inventors: Radhakisan S. Baheti, Schenectady; Nelson R. Corby, Jr., Scotia, both of N.Y.

[73] Assignee: General Electric Company, Schenectady, N.Y.

[21] Appl. No.: 693,545

[22] Filed: Jan. 22, 1985

[51] Int. Cl.⁴ ............................................. B23K 9/12
[52] U.S. Cl. .......................... 219/124.34; 219/130.21; 901/42; 901/47
[58] Field of Search ...................... 219/124.34, 130.21; 901/42, 47; 364/477; 358/101

[56] References Cited

U.S. PATENT DOCUMENTS 4,488,032 12/1984 Case et al. ...................... 219/124.34

OTHER PUBLICATIONS

R. W. Richardson et al., "A Vision Based System for Arc Weld Pool Size Control", Measurement and Control for Batch Manufacturing, ed. D. E. Hardt, ASME, Nov. 1982, pp. 65–75.
R. D. Richardson et al., "The Measurement of Two-Dimensional Arc Weld Pool Geometry by Image Analysis", Control of Manufacturing Processes & Robotic Systems, ed. D. E. Hardt and W. J. Book, ASME, Nov. 1983, pp. 137–148.
R. S. Baheti et al., "Operational Performance of Vision-Based Arc Welding Robot Control System", Sensors and Controls for Automated Manufacturing and Robotics, eds. K. Stelson and L. W. Sweet, ASME, Dec. 1984, pp. 93–105.
N. R. Corby, Jr., "Machine Vision Algorithms for Vision Guided Robotic Welding", 4th Int. Conf. on Robot Vision and Sensory Controls, London, Oct. 1984.

*Primary Examiner*—Clifford C. Shaw
*Attorney, Agent, or Firm*—Donald R. Campbell; James C. Davis, Jr.; Paul R. Webb, II

[57] ABSTRACT

A computationally efficient technique to determine weld puddle area and maximum width in real time from noisy measurements of the puddle trailing edge. Using the torch electrode as the origin, image intensities are sampled in radial directions, and potential pool edge points are extracted. The boundary data is prefiltered to remove extraneous points, and a least-squares algorithm is used to estimate the area and width of the elliptical puddle. The values are sent to a vision-based arc welding robot control system which regulates these pool parameters to assure full penetration welds. Angular orientation of the weld puddle is estimated in an analogous manner.

10 Claims, 10 Drawing Figures

METHOD TO DETERMINE WELD PUDDLE AREA AND WIDTH FROM VISION MEASUREMENTS

BACKGROUND OF THE INVENTION

This invention relates to robotic welding and especially to a method of computing weld puddle geometry parameters from images in real time for use in controlling the weld process.

Research on a vision-based tungsten inert gas (TIG) welding process control system has established that puddle control is more effective when the weld pool area and maximum width are measured and regulated; see application Ser. No. 677,786, filed Dec. 3, 1984, H. A. Nied and R. S. Basheti, "Arc Welding Adaptive Process Control System". However, an intense arc light obscures the puddle boundary near the electrode and the leading edge of the weld pool. The welding torch optical system has been modified to include laser floodlighting of the rear edge of the puddle to improve detectability of the puddle boundary near the trailing edge; this is disclosed in application Ser. No. 641,541, filed Aug. 16, 1984, now U.S. Pat. No. 4,578,561, N. R. Corby, Jr. and S. J. Godwin, "Method of Enhancing Weld Pool Boundary Definition". In practice, the molten weld pool may be constantly changing and has a highly reflective surface which makes reliable extraction of the weld pool boundary difficult.

One prior art approach computes the weld puddle area, length and width with off-line processing of a single video image on a microcomputer system. It requires that most of the puddle boundary points, including points near the leading edge of the electrode, are measured. The Center for Welding Research, Ohio State University, technique is described by R. D. Richardson et al., "The Measurement of Two-Dimensional Arc Weld Pool Geometry by Image Analysis", Control of Manufacturing Processes and Robotic Systems, ASME WAM, Nov. 13-18, 1983, pp. 137-148. The filtering is done in the frequency domain on 64 data points and all terms of the Fourier transform of order three or greater are discarded. An inverse transform is used to return to the spatial domain with the filtered signal. This approach is very restrictive and is computationally inefficient for real-time implementation.

SUMMARY OF THE INVENTION

An object of the invention is to provide an efficient method to compute in real-time the discriminants that can be measured from the weld puddle for controlling an arc welding process.

Another object is the provision of an improved technique of determining weld puddle area, maximum width, and angular orientation from vision measurements of the trailing edge.

This method is based on a physical model of the elliptical weld puddle represented in the polar coordinate system with a minimum number of unknown parameters, either two or three. A least-squares algorithm is used to estimate the model parameters than can be related to puddle area and maximum width, and to puddle orientation. The computational requirements are small and therefore the processing time can be significantly reduced and the bandwidth of the puddle control system can be improved. The puddle boundary representation in polar coordinates is a more efficient approach to extract the puddle boundary from noisy data.

The steps of the method are as follows. Images of the weld puddle are acquired and image intensities are sampled along radial rays intersecting only the trailing edge of the weld puddle, using the torch electrode as the origin. Potential pool boundary points are determined by processing each radial image intensity waveform to identify patterns that indicate potential edge points. There may be one or more points per ray. This puddle boundary data is prefiltered, based on a parabola fit to the near edge, to remove extraneous points. A least-squares algorithm is employed to estimate the area and maximum width of the elliptical weld puddle. These values are presented to the closed-loop weld process control system. In addition the puddle orientation relative to the direction of torch travel is estimated and passed to the control system for use, for instance, as a safety factor to stop welding if the puddle orientation angle is large.

DETAILED DESCRIPTION OF THE INVENTION

Figure 1:
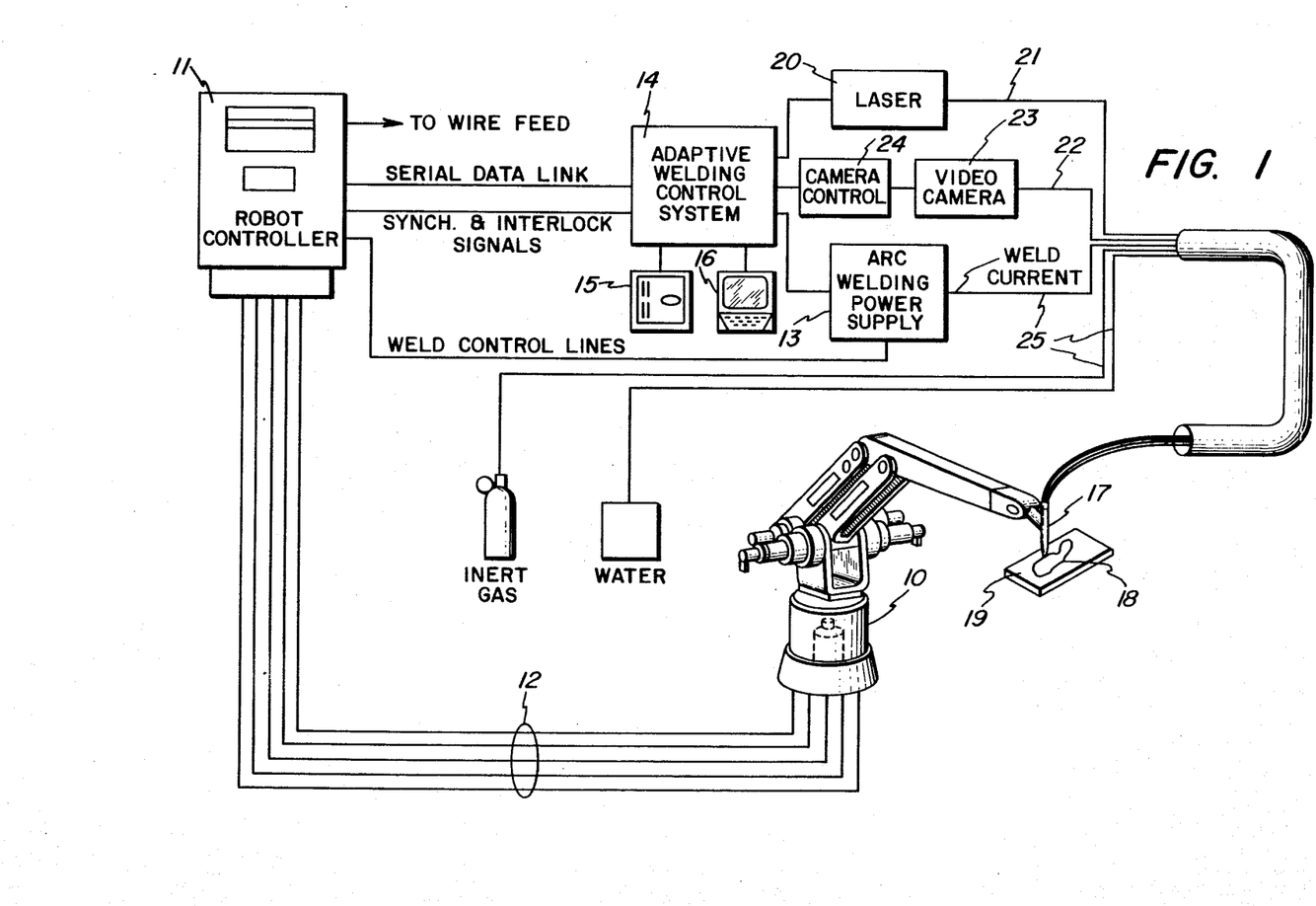
FIG. 1 is a block diagram of a closed-loop robotic arc welding system.

The components of the closed-loop adaptive gas tungsten arc welding system illustrated in FIG. 1 are, briefly, a multiaxis robot 10 and robot controller 11 interconnected by joint control lines 12, a commercially available arc welding power supply 13, a microprocessorbased adaptive welding control system 14, a video monitor 15 to observe the weld puddle and seam, and a user terminal 16. The robot by way of illustration is General Electric's P50 robot, an industrial manipulator having 5 degrees of freedom and a mechanical structure that resembles a parallelogram. This welding system employs a TIG welding torch 17 with an integrated through-torch vision sensor, and automatically tracks the seam 18 in a workpiece 19 and does high quality, full penetration welding of the plates. The vision sub-system includes a laser pattern generator to project a light pattern, such as two parallel stripes, on the metal surface in front of the torch electrode. The pattern is generated by low power laser beams from one or more lasers 20 and reaches the end of the torch after being transmitted through a coherent fiber optic bundle 21.

The image of the weld puddle and seam tracking laser stripes passes along a second coherent fiber optic bundle 22 to a solid state video camera 23 operated by camera controls 24. The weld seam image is analyzed in real time by the welding control system 14 to guide the torch and control the weld process. Supply lines 25 conduct electrical power and welding current, inert cover gas, and cooling water to the welding torch.

Figure 2:
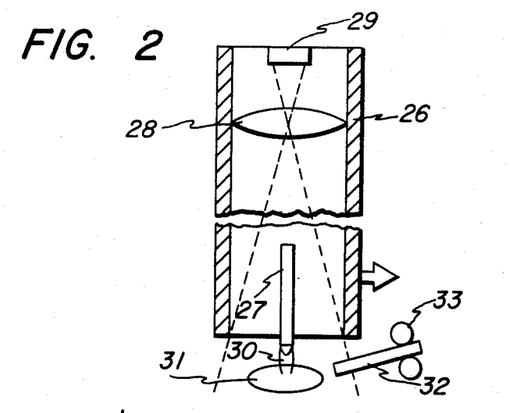
FIG. 2 shows schematically a TIG welding torch having integral puddle view optics and a filler wire feed.

The welding torch with integrated optics, shown schematically in FIG. 2, is described in greater detail in several commonly assigned patents and pending patent applications. The torch barrel and gas nozzle are indicated at 26 and the tungsten electrode at 27. The demagnified image of the weld puddle and weld region provided by an optical lens system 28 built into the torch assembly is focussed onto the face of the fiber optic cable 29. The coherent bundle has ends of the individual fibers arranged in identical matrices at each bundle end, reproducing a two-dimensional image. Current for the welding process conducted by the electrode strikes an electric arc 30 between its end and the workpiece which supplies heat to create a molten weld puddle 31. This figure shows the filler wire 32 and wire feed mechanism 33 represented by two rollers to control its rate of feed. A commercially available wire feeder is attached to the welding torch 17 and to robot 10, controlled by commands from robot controller 11. In FIG. 2 the arrow indicates the direction of torch movement.

Figure 3:
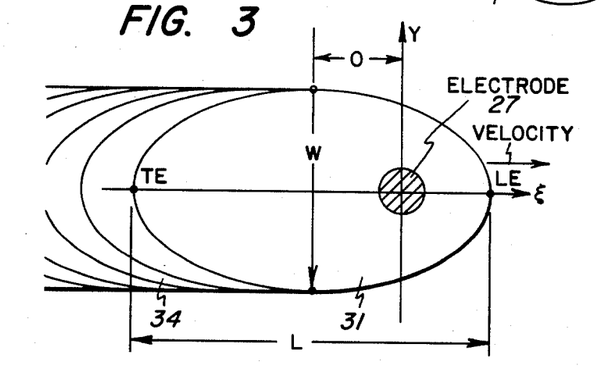
FIG. 3 shows a typical weld puddle geometry.

The multivariable feedback control system (FIG. 8) is based on measuring the weld puddle area and maximum width for controlling the welding process in real time. FIG. 3 schematically shows a typical weld pool geometry as observed from the moving coordinate system using a through-torch optical viewing system. A resolidified area 34 is seen at the trailing or aft part of the roughly oval-shaped molten weld pool 31. The weld pool size and shape change when the welding process parameters, such as torch velocity, input power and filler wire velocity, are varied. The weld puddle maximum width (W) is located aft of the electrode position by the offset distance (0). Points (LE) and (TE) locate the leading and trailing edges of the liquid-solid interface when the torch velocity is directed along the positive ($\xi$) axis. The distance between the points (LE) and (TE) provide the weld pool length (L). The analysis and experiments have shown that the weld puddle width (W) in combination with the surface area (A) of the weld puddle are the best discriminants to use in a TIG welding adaptive process control system. A control strategy based on using both the maximum weld puddle width (W) and area (A) together with the appropriate weighting functions was devised to predict full penetration of the weld bead for thin sheet metal parts.

Photographs of the weld puddle and seam tracking laser pattern observed on the video monitor 15, FIG. 1, show that the leading edge of the weld pool is obscured by the arc light. One of these is FIG. 1 of the technical paper "Operational Performance of Vision-Based Arc Welding Robot Control System", R. S. Baheti et al., Sensors and Controls for Automated Manufacturing and Robotics, eds. K. Stelson and L. W. Sweet, ASME, December 1984, pp. 93-105, the disclosure of which is incorporated herein by reference. Despite the use of laser floodlighting to enhance boundary detection, only the aft part of the puddle boundary can be measured by the vision sensor. Some of the disturbances that make a reliable extraction of weld puddle boundary difficult are enumerated. The surface of the molten puddle under normal welding conditions is convex, but may have depressions caused by circular movements in the molten material or by cover gas flow. The nature of the puddle surface and puddle boundary is significantly affected by torch velocity and tilt of the workpiece surface. Electrical and thermal imbalances can create quite asymmetrical and distorted boundaries. The average reflectivity of the puddle is very high, but the surface can have local areas of much lower reflectivity. For example, oxide rafts may be formed which can circulate randomly in the molten puddle due to electromagnetic or thermal gradients. The thermal distortion due to wire feed can also change the puddle boundary.

An efficient technique has been developed to determine the weld puddle area and maximum width from noisy measurements of the puddle trailing edge. The method is based on a physical model of the weld puddle represented in the polar coordinate system with a minimum number of unknown parameters. A least-squares algorithm determines the model parameters which can be related to the puddle area and width. The computational requirements are small and therefore the processing time (currently at five images per second) can be significantly reduced and the bandwidth of the puddle control system can be improved. The puddle boundary representation in the polar coordinates is a more efficient approach to extract the puddle boundary from noisy data.

Figure 4:
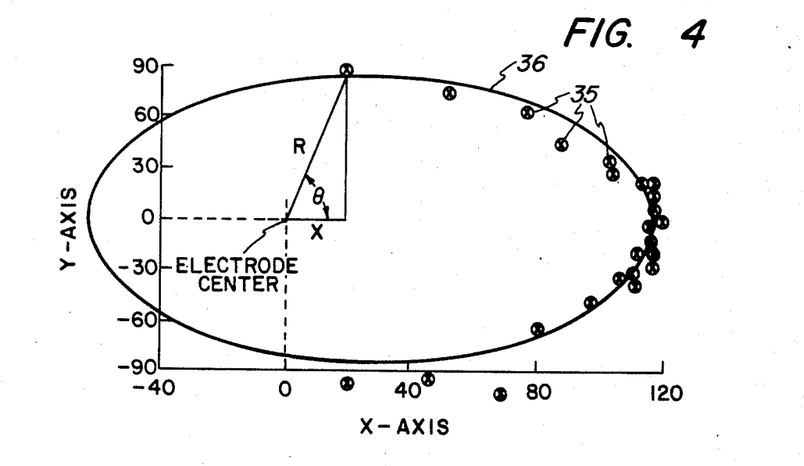
FIG. 4 illustrates a predicted puddle boundary based on 25 measurements of puddle boundary as determined by the vision sub-system.

FIG. 4 illustrates prediction of the puddle boundary from vision data. Pixel numbers are shown along the X and Y axes; the torch electrode center is used as the origin when the weld puddle image is processed. Vision data points 35 were obtained from processing a video image of the molten puddle during welding experiments. The predicted puddle boundary 36 is calculated by the least-squares algorithm based on 25 measurements of the puddle trailing edge. The boundary is assumed to be an ellipse having the electrode center at one of its focal points.

Figures 5, 6:
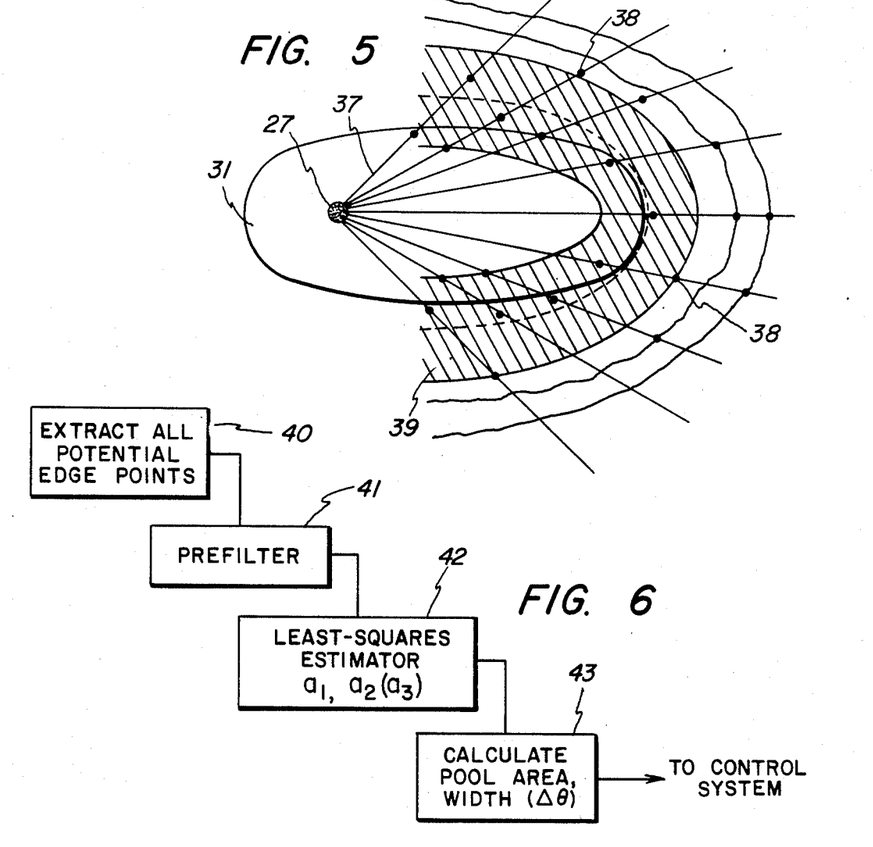
FIG. 5 depicts potential pool edge points resulting from radial sampling and prefiltering the data to remove extraneous points based on a parabola fit to the trailing edge of the puddle.
FIG. 6 is a flow diagram of the processing of vision data and calculation of pool area, maximum width and puddle orientation.

FIG. 5 depicts prefiltering of the vision data to screen out clearly extraneous points to which the least-squares technique would be sensitive. The processing described is performed by the vision microprocessor in the adaptive welding control system 14. An image is acquired and image intensities are sampled in radial directions at a predetermined angular and radial resolution. Radial rays 37 are centered on electrode 27 and intersect only the trailing edge of weld puddle 31, covering a total angle of about 90° to 120°. The next step is to determine all potential pool boundary points 38. Along the rays, each one-dimensional radial image intensity waveform is processed syntactically, by a set of predetermined rules, to determine patterns that indicate potential edge points and a possible puddle boundary. One such pattern is a large intensity change, dark to light, in adjacent pixels. The outlying possible boundary points 38 at the right may be at the crests of ripples, indicated by wavy lines, in the molten metal. Often there are two or three potential boundary points 38 along each ray. Boundary points are selected that are inside of a parabolic screening zone 39 fitted roughly to the trailing edge of the weld puddle. As indicated by the dashed center line, a parabola approximates the shape of the rear edge of the pool. The "peak" of the fitted parabola occurs roughly where the tail of the pool occurs. The trailing edge point TE is normally along or close to the x axis of the moving coordinate system.

The weld puddle area and maximum width are estimated in real time from the prefiltered puddle boundary data, by means of the least-squares algorithm whose derivation is now developed. The least-squares method has been defined as a technique of fitting a curve close to some given points which minimizes the sum of the squares of the deviations from the curve. In this case the curve is an ellipse and the deviations are radial distances. It has been shown by H. A. Nied, from mathematical models of the weld pool, that the puddle boundary, S, in a moving coordinate system can be represented by $$S(R, \theta) = \frac{C_1}{R} e^{-(C_2 R \cos \theta)}, \quad (1)$$

where R is the radial distance of the puddle boundary at an angle $\theta$ measured from the center of the electrode (see FIG. 4). The constants $C_1$ and $C_2$ can be expressed as functions of power input and the torch velocity, respectively. Using the first two terms of the exponential series expansion, equation (1) can be rearranged as $$R = \frac{C_1}{S} - \frac{C_1 C_2}{S} X \quad (2)$$

where X denotes the X-coordinate of the puddle boundary (FIG. 4). Equation (2) can be rewritten as $$R = a_1 + a_2 X \quad (3)$$

where $a_1 = C_1/S$ and $a_2 = -C_1 C_2/S$ are the unknown parameters. Equation (3) is an equation of an ellipse with the electrode center at one of the focal points of the ellipse. It is a two degree of freedom ellipse. The least-squares technique is efficient because the unknown parameters $a_1$ and $a_2$ are linear in the model. The solution can be obtained in one calculation and iteration is not necessary.

A least-squares algorithm to estimate the unknown parameters is summarized as the following. Refer to H. W. Sorenson, "Parameter Estimation", Marcel Dekker, 1980, for more information.

1. Compute mean values $\overline{X}$ and $\overline{R}$ given by $$\overline{R} = \frac{1}{M} \sum_{i=1}^{M} R_i \quad (4)$$

$$\overline{X} = \frac{1}{M} \sum_{i=1}^{M} X_i$$

where M denotes the number of puddle boundary points.

2. Compute correlation functions $$\phi_{XR} = \frac{1}{M} \sum_{i=1}^{M} (X_i - \overline{X})(R_i - \overline{R}) \quad (5)$$

$$\phi_{XX} = \frac{1}{M} \sum_{i=1}^{M} (X_i - \overline{X})^2$$

The first is the cross correlation function and the second the autocorrelation function.

3. The estimated parameters denoted by $\hat{a}_1$ and $\hat{a}_2$ are given by $$\hat{a}_2 = \phi_{XR}/\phi_{XX} \quad (6)$$
$$\hat{a}_1 = \overline{R} - \hat{a}_2 \overline{X}$$

4. The puddle area and maximum width is given by $$\text{PUDDLE AREA} = (\pi \hat{a}_1^2)/(1 - \hat{a}_2)^2 \quad (7)$$
$$\text{PUDDLE WIDTH} = 2\hat{a}_1$$

In FIG. 4, the puddle boundary was predicted based on 25 boundary measurements, the parameters $a_1$ and $a_2$ were estimated using equation (6) and the puddle area and width were computed from equation (7). For data shown in FIG. 4, $\hat{a}_1 = 82$ and $\hat{a}_2 = 0.3$. The puddle area is 23,210 square pixels and maximum width is 164 pixels.

The steps used in determining weld puddle area and width in real time from weld region images provided by a vision system are summarized with reference to FIGS. 5 and 6. Images of the weld puddle are acquired, and each image is sampled along N radial rays centered on the electrode and intersecting only the trailing edge of the weld puddle. All potential edge points are extracted as shown at 40 and passed to the prefilter 41, where points inside a parabolic zone fitted roughly to the puddle trailing edge are selected. The prefiltered boundary data is sent to the least-squares estimator 42, for estimating the unknown parameters $a_1$ and $a_2$. These estimated parameters are employed at 43 to explicitly calculate puddle area and maximum width, and these values are passed to the closed-loop weld process control system (FIG. 8) to control weld current. Instead of relying only on the estimated parameters derived from a single image, a modification is that the results of one or more previous frames can be used, weighting the sum of current and past estimated parameters. This exploits the frame-to-frame time correlation of the pool scene.

During the welding process, the puddle tail may not be aligned with the direction of torch travel. The misalignment may be due to process disturbances or due to curved geometry of the weld path. The least-squares algorithm described above to estimate puddle width and area can be modified to include the effect of the puddle orientation.

Figure 7:
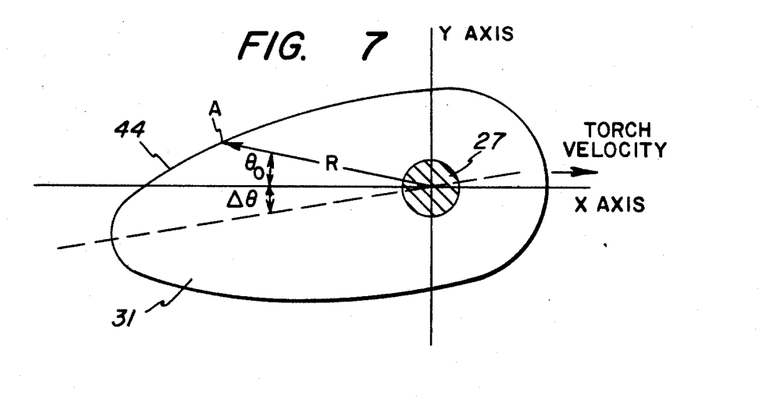
FIG. 7 illustrates misalignment of the puddle tail relative to the direction of torch travel.

Referring to FIG. 7, let $\Delta\theta$ denote the puddle angular orientation with respect to the X-axis of the torch. It is assumed that the X-axis is in the direction of torch travel. Let R and $\theta_o$ denote the coordinates of point A on the puddle boundary 44 measured from the center of the electrode. From equation (3), substituting $X = R \cos \theta$ and letting $\theta = \theta_o + \Delta\Theta$, the puddle boundary can be represented by $$R = \frac{a_1}{1 - a_2 \cos(\theta_o + \Delta\theta)} \quad (8)$$

It is assumed that $\Delta\Theta$ is small (in practice less than 10 degrees). Making the usual assumptions if an angle is small, then $$R = \frac{a_1}{1 - a_2(\cos\theta_o - \Delta\theta\sin\theta_o)} \quad (9)$$

Equation (9), letting $R \cos\Theta_o = X$ and $R \sin\Theta_o = Y$, can be rearranged as $$R = a_1 + a_2 X + a_3 Y \quad (10)$$

where $a_3 = \Delta\Theta a_2$. This represents a three degree of freedom ellipse. In an analogous manner, the estimated parameters $a_1$, $a_2$ and $a_3$ are calculated, and from these the puddle area, width and angular orientation are determined as shown in FIG. 6.

At the present time knowledge of the angular orientation of the weld pool relative to the direction of torch travel is used for safety purposes, to stop welding if $\Delta\Theta$ is, say, greater than 10°. A large percentage of the time, the third ellipse shape parameter, $a_3$, is zero and determination of estimated area by the two parameter algorithm is satisfactory. Since the prefilter based on a parabola fit to the puddle tail provides relatively weak prefiltering, the orientation of the parabolic screening zone may remain fixed, symmetrical with the $\xi$ axis.

Figure 8:
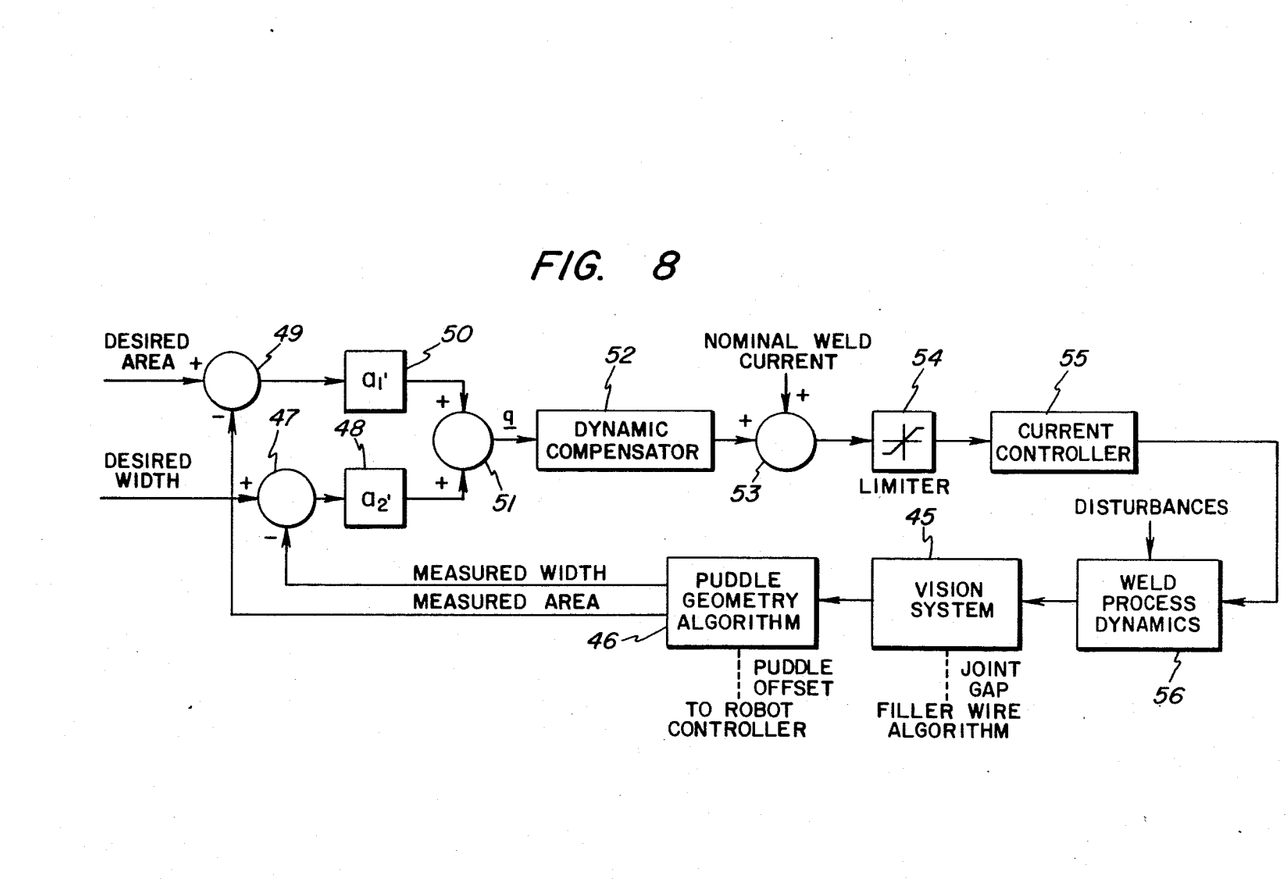
FIG. 8 is a block diagram of an arc welding control system based on weld puddle area and width measurements.

A block diagram of the adaptive feedback control system based on weld puddle area and maximum width measurements is shown in FIG. 8. The measurement subsystem along with the puddle geometry algorithm that has been described determines the puddle area and maximum width at discrete time intervals. The area and maximum width measurements are compared with the desired area and maximum width. An approximate measure of the puddle geometry error q is defined as $$q = a_1'(A_d - A_m) + a_2'(W_d - W_m)$$

where
$A_d$ = desired puddle area
$A_m$ = measured puddle area
$W_d$ = desired puddle width
$W_m$ = measured puddle width The weighting constants $a_1'$ and $a_2'$ can be selected based on the control objective. For example, $a_1' = 1$, and $a_2' = 0$ will regulate the puddle area. On the other hand, $a_1' = 0$ and $a_2' = 1$ will provide a control of the puddle width.

In FIG. 8, the vision system 45 provides images of the weld pool to the adaptive welding control system 14 (FIG. 1) and the puddle geometry algorithm 46 determines measured maximum width and measured area. The difference between desired and measured widths is computed at 47 and multiplied by the preassigned constant $a_2'$ at 48. Similarly, the difference between desired and measured areas is taken at 49 and multiplied by the weighting constant $a_1'$ at 50. The puddle area and maximum width error terms are added at 51 and the result, the puddle geometry error q, is the input to a dynamic comprensation algorithm.

The function of the dynamic compensator 52, typically a proportional, integral and derivative (PID) compensator, is to minimize the effects of process disturbances on the puddle geometry, stabilize the closed-loop system, and provide a robust dynamic performance. The output of the dynamic compensator is a function of the puddle geometry error and determines, at 53, a correction to the nominal welding current. The corrected welding current command is presented to a limiter 54 where it is clamped between upper and lower limits. Up to this point, the calculation of puddle geometry error, dynamic compensation, and limiting of the corrected welding current value are performed by the microprocessor-based adaptive welding control system 14 in FIG. 1. The welding current command is passed to the current controller 55 which is in the arc welding power supply 13. Block 56 represents a dynamic model of the molten pool in terms of gain and thermal time constant. The process disturbances include, for instance, tack welds, heat sinks, filler wire feed rate changes, and undesirable puddle orientation. In the closed-loop control, the heat input to the molten weld pool is directly influenced by the welding current. The vision system computes the weld puddle boundary, and the puddle geometry algorithm determines the puddle area and maximum width, and the feedback loop is closed. The torch travel speed is preprogrammed and is not modified by the control system.

The referenced Baheti et al. paper and application Ser. No. 677,786 contain a fuller explanation of the closed-loop weld process control. The robotic welding system is for non-autogenous welding with wire feed and autogenous welding without filler wire.

Figure 9:
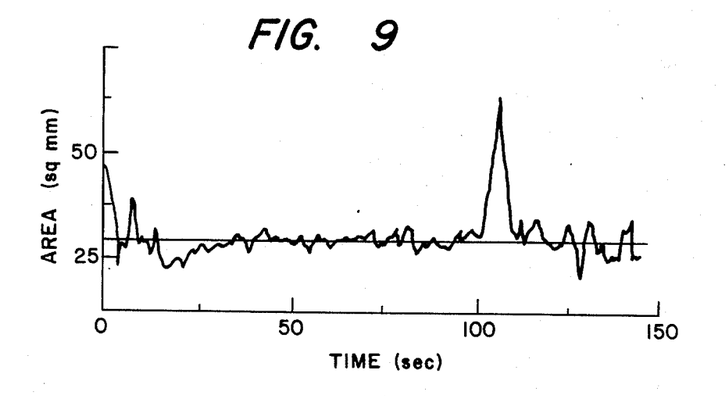
FIGS. 9 and 10 are plots of puddle area and weld current as a function of time and illustrate the results of a heat sink disturbance test.
Figure 10:
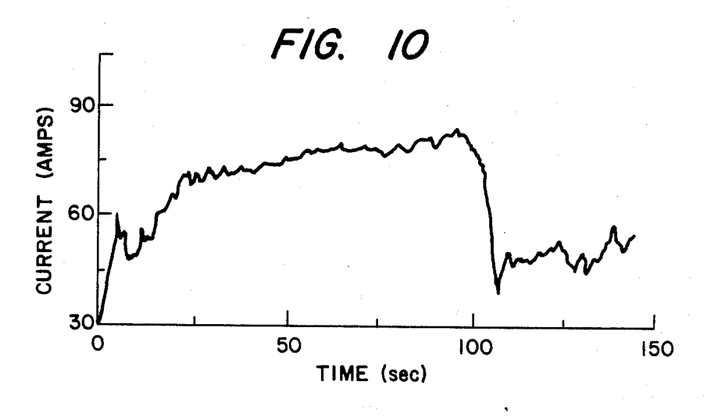

The method presented here has been successfully tested with real vision data. A plot of the puddle area and weld current under closed-loop control with a heat sink disturbance in the weld fixture is shown in FIGS. 9 and 10. The control objective is to regulate the puddle area by changing the current to counteract the process disturbances. It is seen that the weld current increases from 50 to 70 amperes to maintain puddle area close to the reference. When the weld torch moves away from the heat sink, the puddle area increases rapidly, and therefore the current is reduced by the feedback control system. The current controller responds to external disturbances and maintains the puddle area near the reference value. The vision algorithm provides the estimates of the puddle area and width during the closed-loop control.

While the invention has been particularly shown and described with reference to preferred embodiments thereof, it will be understood by those skilled in the art that various changes in form and details may be made without departing from the spirit and scope of the invention.

What is claimed is:

1. In a robotic welding operation wherein welding current conducted by the nonconsumable electrode of a welding torch generates an electric arc whose heat forms a molten weld puddle in the workpiece, and a vision system integrated with said torch provides images of said weld puddle to control the welding process, the improved method of measuring puddle geometry parameters comprising:

sampling image intensities along N radial rays intersecting only the trailing edge of said weld puddle, using the torch electrode as the origin;

determining pudlde boundary point data by processing each radial image intensity waveform to identify patterns that indicate potential edge points;

prefiltering the puddle boundary data to remove extraneous points;

estimating in real time by means of a least-squares algorithm the area and maximum width of the elliptical weld puddle; and passing these values to a closed-loop weld process control system.

2. The method of claim 1 wherein the boundary data is prefiltered based on a parabola fit to the puddle trailing edge.

3. The method of claim 1 and additionally estimating puddle orientation relative to the direction of torch travel.

4. The method of claim 1 wherein said N radial rays along which each image is sampled cover a total angle of about 90° to 120°.

5. The method of claim 4 wherein the puddle boundary data is prefiltered by selecting points inside a parabolic zone approximately fitted to the puddle trailing edge.

6. A method of determining weld puddle area and maximum width in real-time from weld region images provided by a vision system on an arc welding torch which has a nonconsumable electrode, comprising:

acquiring images of the weld puddle;

sampling each image along N radial rays centered on said electrode and intersecting only the trailing edge of said weld puddle;

determining all potential puddle boundary points from intensity variations along each ray;

prefiltering the foregoing boundary data to remove clearly extraneous points;

estimating by means of a least-squares algorithm the unknown parameters in an equation of an ellipse; and employing said estimated parameters to explicitly calculate puddle area and maximum width, and passing these values to a closed-loop weld process control system.

7. The method of claim 6 wherein said N radial rays along which each image is sampled are equally spaced and cover a total angle of about 90° to 120°.

8. The method of claim 7 wherein said ellipse has two degrees of freedom and two parameters are estimated.

9. The method of claim 7 wherein said ellipse has three degrees of freedom and said estimated parameters are used to additionally calculate weld puddle orientation relative to the direction of torch travel.

10. The method of claim 6 wherein the boundary data is prefiltered by selecting points inside a parabolic zone roughly fitted to the puddle trailing edge.

* * * * *